Nov. 16, 1954
G. B. DOREY
2,694,317
SLACK ADJUSTER OPERATING LEVER
Filed March 16, 1951
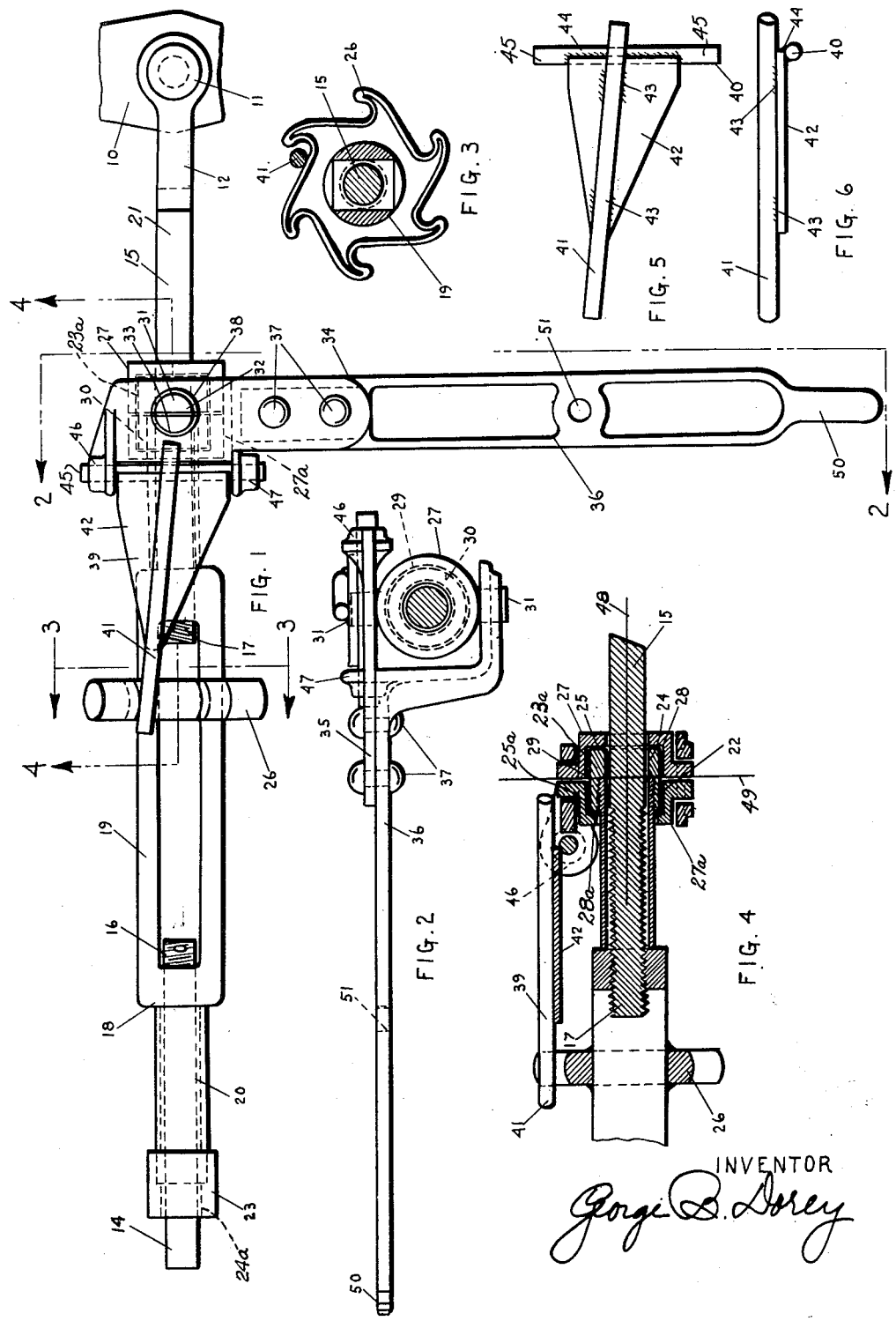
INVENTOR
George B. Dorey

United States Patent Office 2,694,317
Patented Nov. 16, 1954

2,694,317

SLACK ADJUSTER OPERATING LEVER

George B. Dorey, Westmount, Quebec, Canada, assignor to Continental Transport Appliances, Limited, Montreal, Quebec, Canada, a corporation of Canada Application March 16, 1951, Serial No. 215,896

1 Claim. (Cl. 74—522)

This invention relates to an improved type of slack adjuster operating lever employed in connection with a ratchet take-up mechanism for effecting rotation of a screw take-up device to compensate for wear in the brake parts and is by way of an improvement on my pending United States application Serial No. 208,396 filed January 29, 1951, now abandoned.

The objects of the invention among others are to provide an improved pivoted lever arm as one of the arms of a bell crank lever and provided with a rearward extension for engagement with the companion arm of the bell crank lever to thereby limit movement of the arm in an upward direction; to provide an improved pivotally mounted pawl arm which is readily built up in welded construction from a flat plate and round bar stock; and to provide a simplified trunnion mounting for a bell crank lever including oppositely disposed cup shaped bearing members, positioned in facing relation to enclose the bearing collar of a screw take-up device.

For further comprehension of the invention reference may be had to the accompanying drawing wherein:

Figure 1 is a plan view of a bell crank lever assembly incorporating the improvement as applied to the center rod of the leverage system of a railway car.

Figure 2 is a vertical transverse sectional view taken through the assembly as seen on a line 2—2 of Figure 1.

Figure 3 is a vertical longitudinal sectional view taken on a line 3—3 of Figure 1.

Figure 4 is a vertical transverse sectional view taken through the take-up device as seen on a line 4—4 of Figure 1.

Figure 5 is a plan view of the improved pivoted pawl member.

Figure 6 is a vertical side elevational view of the pawl member shown in Figure 5.

In said drawing a portion of the brake leverage system is indicated by showing a portion of the live lever at 10 and pivotally connected thereto at 11 is the center rod connection 12.

The center rod connection 12 is divided lengthwise into two sections as indicated at 14 and 15 respectively and the respective sections are screw threaded to form right and left hand screw threads at 16 and 17 respectively. Co-operating with the threaded ends of the rods is a complementary screw threaded take-up device indicated generally at 18 and includes a turnbuckle 19 with tubular extension sleeves 20 and 21 welded thereto. The outer end of each sleeve is exteriorly threaded at 22 to receive an interiorly threaded bearing collar indicated at 23 and 23a respectively and the said respective collars beyond the threaded portion are formed with inner annular bearings 24 and 24a which encircle the related rod section and forms a carrying means for the rod to prevent sagging of the parts. The sleeves are of a length sufficient to completely enclose the threaded ends of the rod sections and the said collars 23 and 23a are of greater diameter than the sleeves in order to provide end thrust walls 25 and 25a respectively.

A toothed ratchet wheel member 26 is welded or otherwise secured to the turnbuckle 19 intermediate its ends and mounted on the collar 23 which is disposed intermediate the lever 10 and the ratchet member 26 is a bearing formed of a pair of cup shaped bearing members indicated at 27 and 27a respectively and positioned in facing relation to enclose the collar 23a with the bottom walls 28 and 28a of the respective cups lying adjacent the respective thrust walls 25 and 25a of the collar 23a.

The inner walls 29 of each cup presents an annular bearing which encircles the outer arcuate face 30 of the collar. The bearing members 27 and 27a are each provided with an upwardly extending trunnion portion 31 of semicircular shape with a flat wall 32 and an arcuate shaped face 33 so disposed that when the respective members of the pair are in operative relation the said trunnion portions form a complete circular shaped pivots which constitute mountings for a bell crank lever assembly 34.

The lever assembly 34 includes an upper section and a lower section as indicated at 35 and 36 respectively, the said sections being disposed in flatwise relation and united by rivets 37.

The inner ends of the respective sections are apertured at 38 to receive the trunnion portions 31 and thereby maintain the respective cup sections in axial relation to the collar.

Extending laterally from the arm 34 is a pawl arm 39 which is pivotally mounted thereon for up and down swinging movement. The arm 39 is preferably formed of two round rods indicated at 40 and 41 respectively and arranged in angular relation on opposite sides of a web plate 42, said respective rods being welded to the plate as indicated at 43 and 44.

The rod 40 projects beyond each side edge of the plate 42 to form pintles 45 which are received in aligned bearings 46 and 47 of the lever assembly 34. The bearing 46 is disposed at the outer end of the upper section 35 of the assembly 34 and formed integrally therewith and bearing 47 is formed integrally with the lower section 36 of said lever assembly.

The web plate 42 is of sufficient length to overlie the turnbuckle and the under surface of said plate is arranged to be supported by the outer surface of the turnbuckle when the pawl arm 39 is swung clear of the ratchet wheel.

The rod 41 is extended rearwardly into the plane of the upper section 35 of the lever assembly and the upward swinging movement of the arm is thereby limited to the extent necessary for the rod 41 to clear the ratchet teeth. There is thus provided a lever structure having all the characteristics of universal movement, the lever assembly being rotatable as a whole about the axis 48 of the screw take-up device and also swingable at right angles thereto about the axis 49 of the trunnion mounting.

Upon oscillation of the lever assembly about axis 48 the forwardly projecting end of rod 41 sweeps along the periphery of the ratchet member 26, the teeth of said ratchet member being of such shape as to permit of free movement of the arm above the ratchet wheel when the lever is swung in an anti-clockwise direction as viewed in Figure 1, and movable in unison with the ratchet wheel when swung in the opposite direction.

The method of swinging the lever may be accomplished either manually or automatically by the application of force on the lever and to this end a handle 50 is provided for manual operation and in the event that automatic operation is called for there is provided a hole 51 for connecting with suitable operating mechanism such as the releasing energy of a spring.

What I claim as new is:

In a slack adjuster for varying the length of a brake connection including a screw-threaded rod and a complementary screw-threaded take-up device co-operating therewith and operable by rotation thereof for varying the length of the connection; a toothed ratchet wheel fixedly mounted on the take-up device; and a bell crank lever pivotally mounted with respect to the take-up device, said lever having an operating arm extending outwardly laterally relative to the take-up device and having the other arm extending to intersect the ratchet wheel and pivotally mounted with respect to the first named arm to operate as a pawl and move freely towards and away from the axis of the ratchet wheel for ratcheting engagement with the teeth of the ratchet wheel when swung in one direction and movable independently thereof when swung in the opposite direction, said pawl arm being formed of bars arranged in intersecting relation and having a plate disposed between said bars and welded thereto, one of said bars forming the pivotal mounting of the pawl arm and the other of said bars projecting beyond the plate to provide overhanging portions beyond the ends of the plate, one of said overhanging portions engaging with the teeth of the ratchet wheel and the other overhanging portion extending beyond the axis across the pivotal mounting of the pawl arm to engage with the operating arm and limit upward swinging movement of the pawl arm.

References Cited in the file of this patent

UNITED STATES PATENTS

| Number | Name | Date |
|---|---|---|
| 795,401 | Leigh | July 25, 1905 |
| 2,555,124 | Gothberg | May 29, 1951 |
| 2,564,447 | Pritchard | Aug. 14, 1951 |